(12) United States Patent
Filippi et al.

(10) Patent No.: US 9,260,303 B2
(45) Date of Patent: Feb. 16, 2016

(54) PROCESS FOR PRODUCING AMMONIA SYNTHESIS GAS AND A RELATED FRONT-END OF AN AMMONIA PLANT

(71) Applicant: Casale SA, Lugano-Besso (CH)

(72) Inventors: Ermanno Filippi, Castagnola (CH); Raffaele Ostuni, Milan (IT)

(73) Assignee: Casale SA (CH)

( * ) Notice: Subject to any disclaimer, the term of this patent is extended or adjusted under 35 U.S.C. 154(b) by 0 days.

(21) Appl. No.: 14/380,741

(22) PCT Filed: Jan. 15, 2013

(86) PCT No.: PCT/EP2013/050628
§ 371 (c)(1),
(2) Date: Aug. 25, 2014

(87) PCT Pub. No.: WO2013/124092
PCT Pub. Date: Aug. 29, 2013

(65) Prior Publication Data
US 2015/0014596 A1 Jan. 15, 2015

(30) Foreign Application Priority Data
Feb. 24, 2012 (EP) .................... 12156815

(51) Int. Cl.
*C01B 3/48* (2006.01)
*B01D 53/047* (2006.01)
(Continued)

(52) U.S. Cl.
CPC . *C01B 3/48* (2013.01); *C01B 3/025* (2013.01); *C01B 3/36* (2013.01); *C01B 3/382* (2013.01);
(Continued)

(58) Field of Classification Search
CPC ..... Y02C 20/20; F02C 3/22; C01B 2203/044;
C01B 2203/1076; C01B 2203/0816; C01B 2203/1052; C01B 2203/146; C01B 2203/0877; C01B 2203/0822; B01D 53/047; B01D 2253/102; B01D 2257/504; B01D 2259/404; F01K 21/047
USPC .......................................... 252/373; 423/360
See application file for complete search history.

(56) References Cited

U.S. PATENT DOCUMENTS 3,404,957 A * 10/1968 Blaskowski ................. 423/359
4,725,380 A * 2/1988 Pinto ............................ 252/376
(Continued)

OTHER PUBLICATIONS

International Preliminary Report on Patentability issued in connection with PCT/EP2013/050628.
(Continued)

Primary Examiner — Stanley Silverman
Assistant Examiner — Syed Iqbal
(74) Attorney, Agent, or Firm — Akerman LLP

(57) ABSTRACT

A process for producing ammonia synthesis gas from a hydrocarbon source, comprising: conversion of the hydrocarbon source into a raw synthesis gas (14) in ATR or POX reactor (11) which is fired with oxygen (12) or oxygen-enriched air (28); a water-gas shift treatment of the raw synthesis gas (14), which consist of a medium-temperature shift (15) at a temperature of 200-300° C., thus obtaining a shifted synthesis gas (16); purification of said shifted synthesis gas (16) including at least a step of pressure-swing adsorption (17) to remove residual carbon oxides and methane from the synthesis gas, obtaining a purified synthesis gas (18), and optionally, addition of nitrogen (19) to said purified synthesis gas (18), thus obtaining ammonia synthesis gas with a desired hydrogen to nitrogen ratio.

19 Claims, 4 Drawing Sheets

(51) Int. Cl.
  *F02C 3/22* (2006.01)
  *C01B 3/02* (2006.01)
  *F01K 21/04* (2006.01)
  *F02C 3/30* (2006.01)
  *C01B 3/56* (2006.01)
  *C01B 3/36* (2006.01)
  *C01B 3/38* (2006.01)

(52) U.S. Cl.
  CPC . *C01B 2203/0233* (2013.01); *C01B 2203/0244* (2013.01); *C01B 2203/0255* (2013.01); *C01B 2203/0283* (2013.01); *C01B 2203/042* (2013.01); *C01B 2203/043* (2013.01); *C01B 2203/048* (2013.01); *C01B 2203/0465* (2013.01); *C01B 2203/0475* (2013.01); *C01B 2203/068* (2013.01); *C01B 2203/1235* (2013.01)

(56) References Cited

U.S. PATENT DOCUMENTS

2009/0035206 A1 2/2009 Filippi
2010/0303703 A1 12/2010 Filippi et al.
2011/0297886 A1 12/2011 Panza

OTHER PUBLICATIONS

International Search Report issued in connection with PCT/EP2013/050628.

* cited by examiner

PROCESS FOR PRODUCING AMMONIA SYNTHESIS GAS AND A RELATED FRONT-END OF AN AMMONIA PLANT

This application is a national phase of PCT/EP2013/050628, filed Jan. 15, 2013, and claims priority to EP 12156815.8, filed Feb. 24, 2012, the entire contents of both of which are hereby incorporated by reference.

FIELD OF THE INVENTION

The invention relates to reforming of hydrocarbons for the preparation of a synthesis gas, also named syngas, for the production of ammonia.

PRIOR ART

The synthesis of ammonia ($NH_3$) requires a synthesis gas comprising hydrogen ($H_2$) and nitrogen ($N_2$) in a suitable molar ratio (HN ratio) of about 3:1. The term ammonia syngas will be used with reference to a synthesis gas with the above composition.

It is known to produce said syngas from the reforming of a hydrocarbon source, for example containing methane.

Conventional reforming such as SMR (steam methane reforming) involves a primary reformer and a secondary reformer. A process for production of ammonia synthesis gas with a primary reformer and a secondary reformer is disclosed for example in EP-A-2 065 337.

According to the prior art, a hydrocarbon source such as natural gas is steam-reformed in a primary reformer at a temperature around 800° C. The first gas product leaving the primary reformer is further reacted with air in a secondary reformer, obtaining a second gas product at around 1000° C. Said second gas product is then cooled for heat recovery and treated to remove carbon oxides and obtain a gas composition suitable for ammonia synthesis i.e. having a HN ratio close to 3:1. Treatment includes shift converters where CO is converted to carbon dioxide and hydrogen, carried out in a high-temperature shift reactor (HTS) at around 400-500° C., and in a low-temperature shift reactor (LTS); a CO2 removal unit such as a washing column; a methanator reactor where the residual carbon oxides are catalytically converted to methane. The so obtained purified gas is then compressed in a syngas compressor to the synthesis pressure which is in the range 80-300 bar and typically around 150 bar. Due to inherent limitations of the catalyst loaded in the HTS reactor, the steam-to-carbon ratio (SC ratio) in the primary reformer must be greater than 2.7 and is typically equal to 3.0.

Some drawbacks of conventional SMR come from the primary reformer. The primary reformer is basically a bundle of externally heated catalytic tubes and introduces limitations in terms of maximum flow rate and pressure. A conventional primary reformer cannot operate at a pressure greater than 35-40 bar, in order to avoid excessive stress on the tubes; hence the duty of the main compressor is remarkable, with a difference of pressure over 100 bar and a pressure ratio greater than 5.

Another drawback of a conventional layout with HTS and LTS is that the high steam-to-carbon ratio means a higher flow rate in the reformer. This increases the duty and size of the steam reformer, due to the relevant flow rate of steam.

Hence the steam reformer of the front-end is substantially the bottleneck of the ammonia plant and imposes a maximum capacity around 3000 tons of ammonia per day.

Some variations to the above described conventional process are also known. Use of excess air can reduce the size of the steam reformer for a given capacity, but does not solve the problem of duty of the syngas compressor and increases complexity because and additional unit is required to remove the nitrogen in excess. A gas-heated reformer is another way to reduce size of the primary reformer, but increases cost and complexity.

A layout with no secondary reformer is also known. The effluent of the primary reformer is routed directly to the CO-shift section, and the purified syngas after shift and CO2 removal is mixed with nitrogen to reach the required HN ratio. Said nitrogen is produced in an air separation unit.

This layout is simple but absence of the secondary reformer may cause methane slip from the primary reformer. The necessary measures to avoid or at least reduce the methane slip include: steam-to-carbon ratio in the reformer close to 3.0; lower operating pressure in the reformer tubes, typically 25-30 bar, but a higher temperature (usually >850° C.). Moreover, the duty of the steam reformer is high because the reformer has to produce all hydrogen for ammonia synthesis, in absence of a secondary reforming.

For the above reasons, a scheme with no secondary reformer has a large steam reformer, e.g. about 50% larger than conventional SMR, and maximum size of the ammonia plant is comparable.

The prior art also includes conversion of the hydrocarbon source in an autothermal reformer (ATR) or in a partial oxidation (POX) reactor. The autothermal reformer is basically a catalytic converter where oxidation of the hydrocarbon source (usually natural gas) takes place and provides the heat for reforming. A POX reactor is a non-catalytic reactor which provides a partial oxidation of the hydrocarbon source.

An autothermal reformer or a POX reactor can operate at a higher pressure than a conventional tube reformer, hence they reduce the duty of the main syngas compressor. However, the prior art layouts based, for example, on autothermal reforming are still quite complex. They usually comprise an ASU to furnish oxygen, a high-temperature shift, then CO2 removal, drying and nitrogen wash to remove inerts. The high-temperature shift forces a steam-to-carbon ratio in the ATR feed to around 3, which increases the size of the equipment in the ATR and HTS effluent cooling sections, and energy consumption. Moreover, due to high operating temperature of the HTS, a significant amount of CO (more than 4.0% v/v, dry) slips from the HTS converter and is lost as fuel gas, increasing the amount of natural gas consumed per ton of product, and the size of the front-end. Finally, the cryogenic purification is costly and energy intensive.

An improvement of these processes is highly desirable, to enable cost effective large ammonia production units which are also easy to operate.

SUMMARY OF THE INVENTION

The aim of the invention is to overcome the drawbacks of the prior art as above discussed.

To this purpose, the invention proposes a process for producing ammonia synthesis gas from a hydrocarbon source, comprising:
  conversion of said hydrocarbon source into a raw synthesis gas solely by means of a catalytic autothermal steam reforming or by means of a non-catalytic partial oxidation with steam, in ATR or POX reactor respectively and without a primary reforming stage;
  said steam reforming or said partial oxidation being carried out with an oxidant which is oxygen or oxygen-enriched air;

a water-gas shift treatment of said raw synthesis gas, which consist of a medium-temperature shift at a temperature of 200-300° C., thus obtaining a shifted synthesis gas;

purification of said shifted synthesis gas, said purification including at least a step of pressure-swing adsorption to remove residual carbon oxides and methane from the synthesis gas, obtaining a purified synthesis gas (18), and optionally, addition of nitrogen (19) to said purified synthesis gas, thus obtaining ammonia synthesis gas with a desired hydrogen to nitrogen ratio.

The conversion is carried out in an ATR or POX reactor according to the choice of autothermal steam reforming or partial oxidation. The invention uses no primary reformer or secondary reformer.

The effluent of the ATR or POX reactor, usually after cooling, is routed directly to a medium temperature shift (MTS) converter operating in the above range of 200 to 300° C. According to the invention, the shift treatment consists of medium-temperature shift at the above defined medium temperature, without a low-temperature or high-temperature shift.

More preferably, the shift temperature is in the range 200 to 250° C. and even more preferably 230 to 250° C.

Said MTS step can be adiabatic or isothermal. Isothermal MTS is preferred in order to improve the conversion of CO and to allow an optimal inlet temperature of the syngas in the MTS converter, as will be explained.

The invention allows the adoption of a low SC ratio in the feed of the reactor. When the reactor is an ATR, said SC ratio is preferably in the range 1.0-2.0. When the reactor is a POX reactor, said SC ratio is preferably in the range 0.5-1.0.

The ATR or POX reactor can be fired with oxygen or enriched air. Said oxygen or enriched air can be produced in an air separation unit (ASU). Said ASU can be of cryogenic type, or of pressure swing adsorption type (PSA), or of vacuum pressure swing adsorption type, or of membrane type.

In oxygen-fired embodiments, nitrogen needs be introduced in the synthesis gas to adjust the hydrogen-to-nitrogen ratio. Preferably, nitrogen is introduced downstream said step of pressure-swing adsorption, i.e. the effluent of the PSA unit is added with a nitrogen (N2) stream. Preferably said nitrogen stream is produced in the same ASU which produces the oxygen for the ATR or POX reactor, in oxygen-fired embodiments. Optionally, an additional stream of nitrogen can be used to regenerate the PSA unit, thus reducing the consumption of syngas. Said additional stream can be taken from the nitrogen stream leaving the ASU.

In enriched air-fired embodiments, nitrogen enters the ATR or POX reactor together with oxygen. Preferably the flow rate and/or enrichment (O2 concentration) of the enriched air feed to the reactor is determined in such a way that the full amount of nitrogen is introduced with the enriched air feed. Hence, no further addition of nitrogen will be required. Also in these embodiments, however, an additional stream of nitrogen could be used to regenerate the PSA unit.

The enriched air-fired embodiments provide that the feed of the PSA unit contains nitrogen. Preferably, the separation of carbon oxides in the PSA unit is limited to avoid a significant loss of nitrogen with said carbon oxides. As a consequence, a methanator is preferably provided downstream the PSA unit, to convert the residual CO and CO2 to methane.

Optionally, if pure CO2 product is required from the plant (e.g. for downstream urea production) the further purification of the shifted synthesis gas includes a CO2 removal, preferably prior to the step of pressure-swing adsorption. According to one embodiment, the shifted synthesis gas effluent after the medium-temperature shift treatment is directed to a CO2 removal step and the so obtained decarbonated synthesis gas is then directed to the step of purification with pressure-swing adsorption. In another embodiment, CO2 is removed from a fuel gas which is separated by said PSA step. The CO2 removal step can be based on a washing with an appropriate physical or chemical solvent.

A first advantage of the invention is the absence of a primary reformer. Hence, the related limits of pressure and flow rate are removed. The ATR or POX reactor can operate at a higher pressure thus providing a higher pressure at the suction side of the main syngas compressor. This means that size, cost and consumption of the compressor are reduced. In some embodiments, the syngas generation pressure can be as high as the ammonia synthesis pressure, so that the make-up compressor is no longer required.

It should be noted that the adoption of the primary reformer, in the prior art, is considered an advantage because it reduces the consumption of oxidant and energy, despite the need of a complex equipment, namely the primary reformer and usually a pre-reformer. The term of energy consumption refers generally to heat required for heating the process streams and/or to produce hot steam. Hence the prior art gives a strong incentive towards a "combined" layout with primary and secondary reforming. Contrary to this incentive, the applicant has found that the consumption of energy can be lower than expected, and that a solution without primary reforming, in combination with a low steam to carbon ratio and medium-temperature shift, can be attractive.

Moreover, a plant with no primary reformer according to the invention can be operated at low SC ratios even without a pre-reformer. A remarkable advantage of the invention is the opportunity to use a low SC ratio without the need of a pre-reformer; accordingly, the plant is much simpler and less expensive.

The medium-temperature shift, in fact, has the great advantage of operation with a lower SC ratio than a conventional HTS, due to different catalyst. Hence the ATR or POX reactor can operate with a lower SC ratio which means that flow rate vs. capacity is reduced. In other words, capacity for a given flow rate is increased or, in the same way, front-end equipment is smaller and less expensive than in the prior art, for a given capacity.

Apart from the above considerations, however, a low SC ratio was discouraged in the prior art due to the following reasons: risk of methane slip (unconverted methane from the reforming section); risk of carbon monoxide (CO) slip from the shift converter; formation of methanol as a byproduct of the shift reaction with copper-based catalysts, which methanol can damage the solution for CO2 removal. Carbon monoxide and methane contained in the product gas must be purged at the expense of energy and increase the volumetric flow rate (hence the size of equipments). In the prior art, they are usually combusted to recover energy, however this solution is feasible as long as the amount of CO and CH4 does not exceed the heat input required by the steam reformer, otherwise their combustion would be practically useless.

The applicant, however, has found that the above problems can be overcome with a process and plant according to the invention, because: purification via pressure-swing adsorption (PSA) is able to remove unconverted methane and CO and prevent from their accumulation in the synthesis loop; a PSA unit is not damaged by possible methanol contained in the gas, since methanol will be removed; the tail gas of the PSA unit can be entirely used as a fuel in the fired heater of the ammonia plant, to preheat the process feeds and superheat the steam, thereby containing the overall consumption of natural gas fuel. Hence, despite the low S/C ratio and unexpectedly, the heating value of the tail gas from the PSA is not more than the total fuel required by the process.

On the other hand, a low SC ratio (significantly lower than 3, and preferably lower than 2 according to some embodiments), has the following advantages. First, a low SC ratio reduces the amount of oxidant required by the partial oxidation step, thus compensating for the absence of a primary reformer and allowing a good conversion of methane into the synthesis gas; second, a low SC ratio reduces the residual heat in the synthesis gas leaving the shift section, which feature is synergistic with the choice of a PSA unit, since the PSA unit does not require a heat input for regeneration contrary to the conventional acid gas removal systems; third, a low SC ratio reduces the dew point of the gas; since the dew point is a function of the pressure (the higher the pressure, the higher the gas dew point), this allows for operation at a higher pressure, which is desirable for various reasons (e.g. smaller flow rate and equipment) without the risk of a damage to the shift catalyst by condensation of the syngas at the catalyst bed inlet.

For all the above reasons, the front-end of an ammonia plant, according to the invention, can be designed to reach a capacity much greater than in the prior art, for example 6.000 tons/day of ammonia or even more.

Another important advantage of the medium-temperature shift is that the inlet temperature of a MTS converter is sufficiently far from the dew point of the syngas, which is around 180° C. Hence, the risk of condensation of syngas and related damage of the catalyst is avoided. Isothermal MTS is preferred to keep a stable temperature in the MTS and further reduce this risk.

As already mentioned, a significant advantage of the PSA step is that it does not consume heat and can remove also methane ($CH_4$) and argon, thereby reducing the concentration of inerts in the synthesis loop, and consequently reducing the size of synthesis equipment, including e.g. the ammonia converter and syngas compressor, and/or reducing the consumption of energy.

The embodiments with O2-enriched air firing the ATR or POX reactor have also the advantage of reducing size and duty of the ASU.

Basically, the invention encompasses the two options of using enriched air or substantially pure oxygen as the oxidant medium. If enriched air is used, introduction of further nitrogen (after purification) is possible; it is preferred, however, to provide a degree of enrichment such that the gas leaving the PSA unit has the desired hydrogen/nitrogen stoichiometric ratio for ammonia synthesis (around 3) without a further introduction of nitrogen, that is the enriched air contains all the required amount of nitrogen.

Preferably, the air is enriched to contain an amount not greater than 40% molar of oxygen ($O_2$), and more preferably said amount is in the range of 30% to 40% molar. The applicant has found that this degree is optimum for providing the required oxygen and, at the same time, a sufficient amount of nitrogen to reach the above mentioned stoichiometric ratio. Conventional systems with a higher degree (usually more than 50%) have the drawback that they require more oxygen (which is expensive to produce) and that they need additional nitrogen. It should be noted that not all air separation plants produce pure nitrogen in addition to oxygen. Hence the avoidance of a nitrogen feed for adjusting the stoichiometric ratio of the product gas is an advantage.

The use of enriched air, preferably with the amount of oxygen not greater than 40% molar as mentioned above, has also the advantage that a smaller and less expensive air separation plant (compared to oxygen-fired embodiments) is sufficient.

It can be noted that the present invention provides an efficient front-end for an ammonia plant featuring only four basic units, namely: an ASU for generation of oxygen or enriched air; ATR or POX reactor; MTS converter, PSA unit. In contrast, the prior art uses complex layouts with more units and/or with a conventional primary reformer and related drawbacks.

To summarize, the invention provides a simpler and less expensive layout as well as a larger single-train capacity, overcoming the bottlenecks of the prior art.

Another aspect of the invention is minimization of the excess of nitrogen, thanks to the use of pure oxygen or enriched air as the oxidant for the ATR or POX. In contrast, the use of air causes a large excess of nitrogen, increasing size and cost of the equipment especially from ATR (or POX) to the PSA unit. According to a preferred feature, excess of nitrogen, if any, is less than 50%.

An aspect of the invention is also a front-end of an ammonia plant according to the attached claims.

The invention is now described with the help of the figures and referring to preferred embodiments.

DETAILED DESCRIPTION OF A PREFERRED EMBODIMENT

Figure 1:
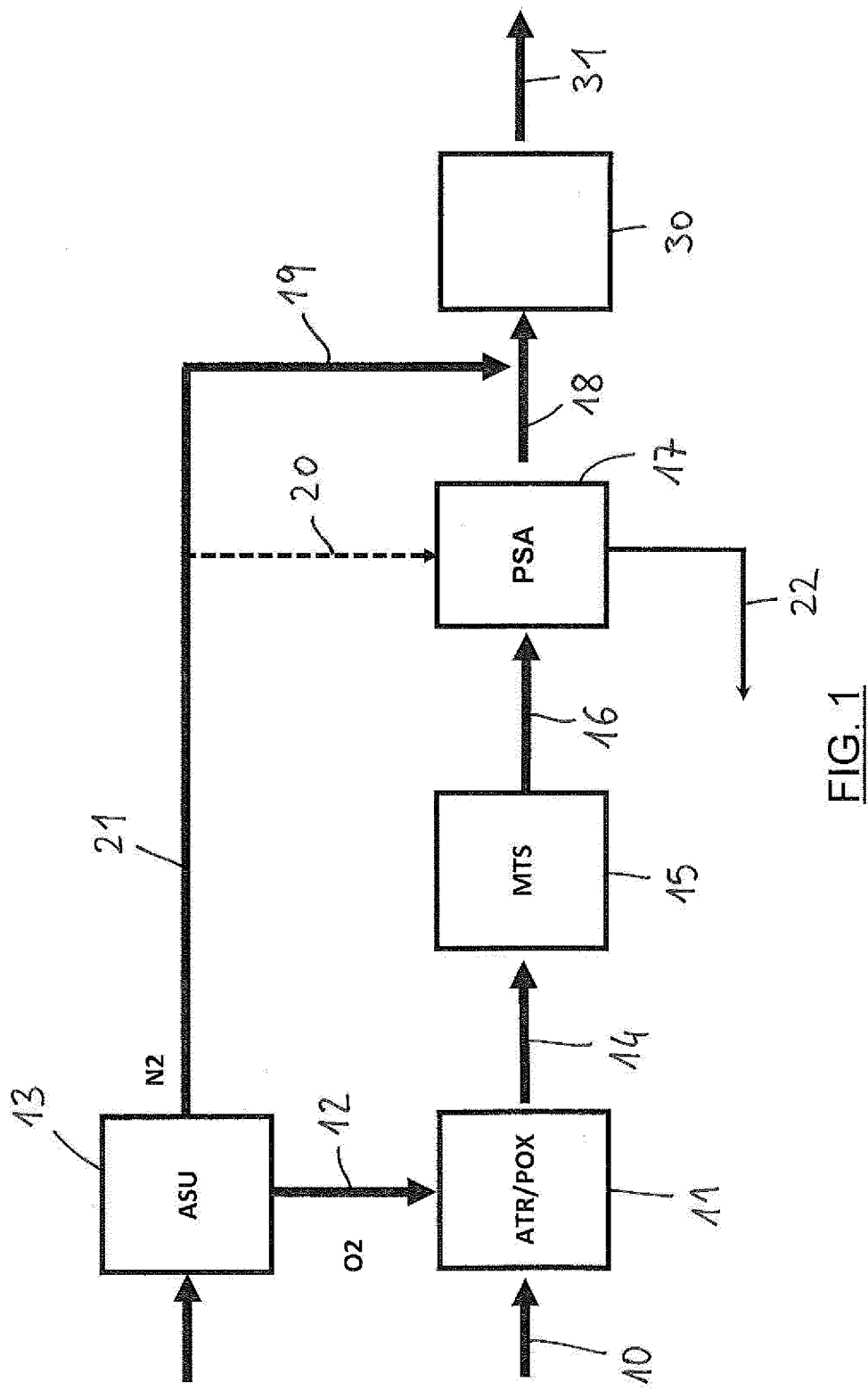
FIG. 1 is a block diagram of a first embodiment of the invention.

FIG. 1 shows a first embodiment with oxygen-fired reactor. A natural gas feed 10 is mixed with steam and is converted to synthesis gas by partial oxidation in oxygen-fired reactor 11 which is either an autothermal reformer or a partial oxidation reactor, according to different options.

The reactor 11 is fired with oxygen flow 12. Depending on the amount required, said oxygen flow 12 can be either produced in a pressure swing adsorption unit, or in a cryogenic air separation unit, or imported as such. In the figure, the oxygen flow 12 comes from an air separation unit (ASU) 13.

The reactor effluent 14, after cooling, is directly routed to a medium temperature shift (MTS) converter 15. Said MTS converter 15 operates at 200° C.-250° C. preferably. The effluent 16 of the MTS converter is routed to a pressure swing adsorption (PSA) unit 17 to remove the residual carbon oxides and methane, without the need of a CO2 washing column.

The purified syngas 18 leaving the PSA unit 17 is added with a nitrogen stream 19 produced in the ASU 13. Optionally, a portion 20 of the available nitrogen stream (flow line 21) from said ASU 13 is used to regenerate the PSA unit 17. According to other (not shown) embodiments, said nitrogen stream 19 and/or stream 20 can be produced in a pressure swing adsorption unit or imported as such.

The PSA unit 17 produces also a fuel gas 22 containing some carbon oxides and methane.

The purified syngas, added with nitrogen and then having the required HN ratio, is then directed to ammonia synthesis section 30 where ammonia 31 is produced.

Figure 2:
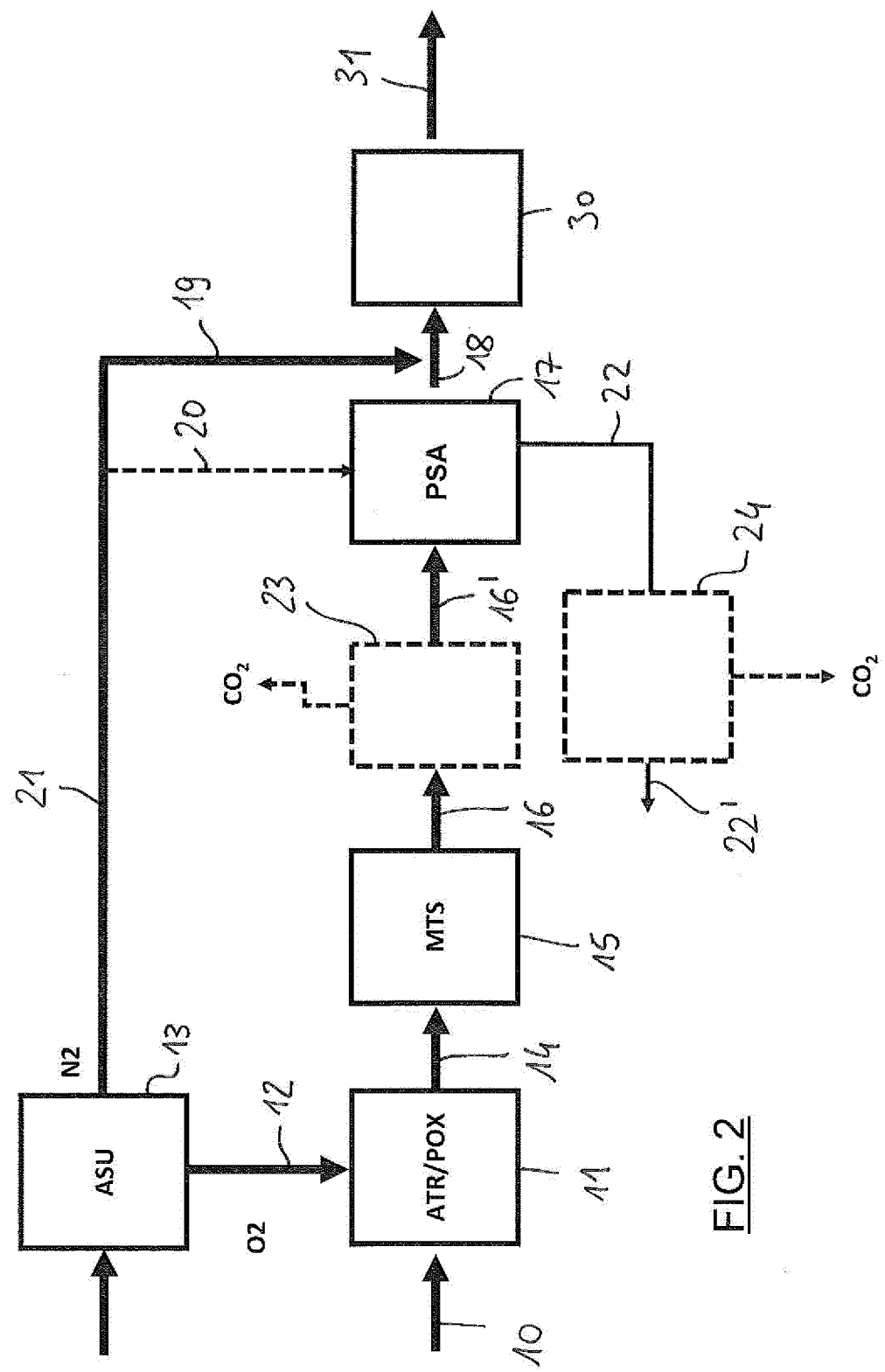
FIG. 2 shows some option features of the embodiment of FIG. 1.

Upstream removal of CO2 is an optional feature, if pure CO2 is required as product (e.g. for urea production). This is shown in FIG. 2. Blocks 23 and 24 show optional CO2 removal units. In a first option, CO2 is removed from MTS converter effluent 16 before admission to PSA unit 17. Hence the PSA unit receives a decarbonated syngas 16' with a reduced content of CO2 or which is substantially CO2-free. In a second option, CO2 is removed from the fuel gas 22 and then a purified fuel gas 22' is obtained.

Figure 3:
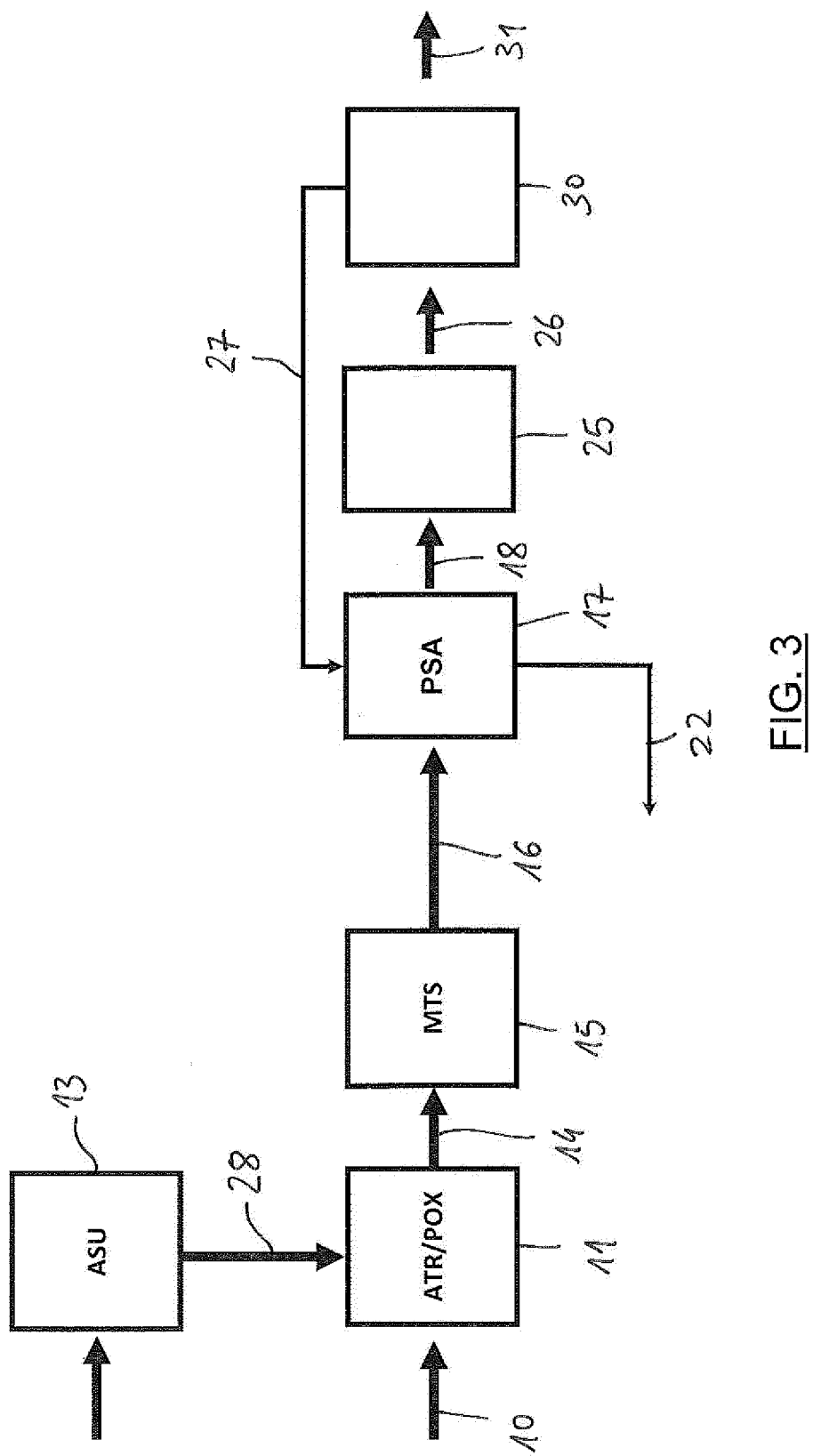
FIG. 3 is a block diagram of a second embodiment of the invention.

FIG. 3 shows an embodiment where the reactor 11 is fired with O2-enriched air. The ASU 13 now produces a stream of enriched air 28 which also contains nitrogen. Preferably the amount of said enriched air 28 is determined in such a way that the effluent 14 contains all the nitrogen required in the ammonia synthesis section 30, i.e. no addition of nitrogen is required. Said ASU 13 is preferably of cryogenic type, or of pressure swing adsorption type, or of vacuum pressure swing adsorption type, or of membrane type.

The effluent 18 of the PSA unit 17 is subject to methanation in a reactor 25, and the so purified gas 26 is directed to the ammonia synthesis section 30. Said reactor 25 convert catalytically the residual CO and CO2 to methane, thereby protecting the ammonia synthesis catalyst. Due to the presence of some methane in the ammonia synthesis gas, a purge stream must be taken from the loop to control the concentration of inerts therein.

The purge gas from the synthesis loop is preferably routed back to the frontend and mixed with the PSA feed, to recover H2 and N2 content of said purge gas.

Figure 4:
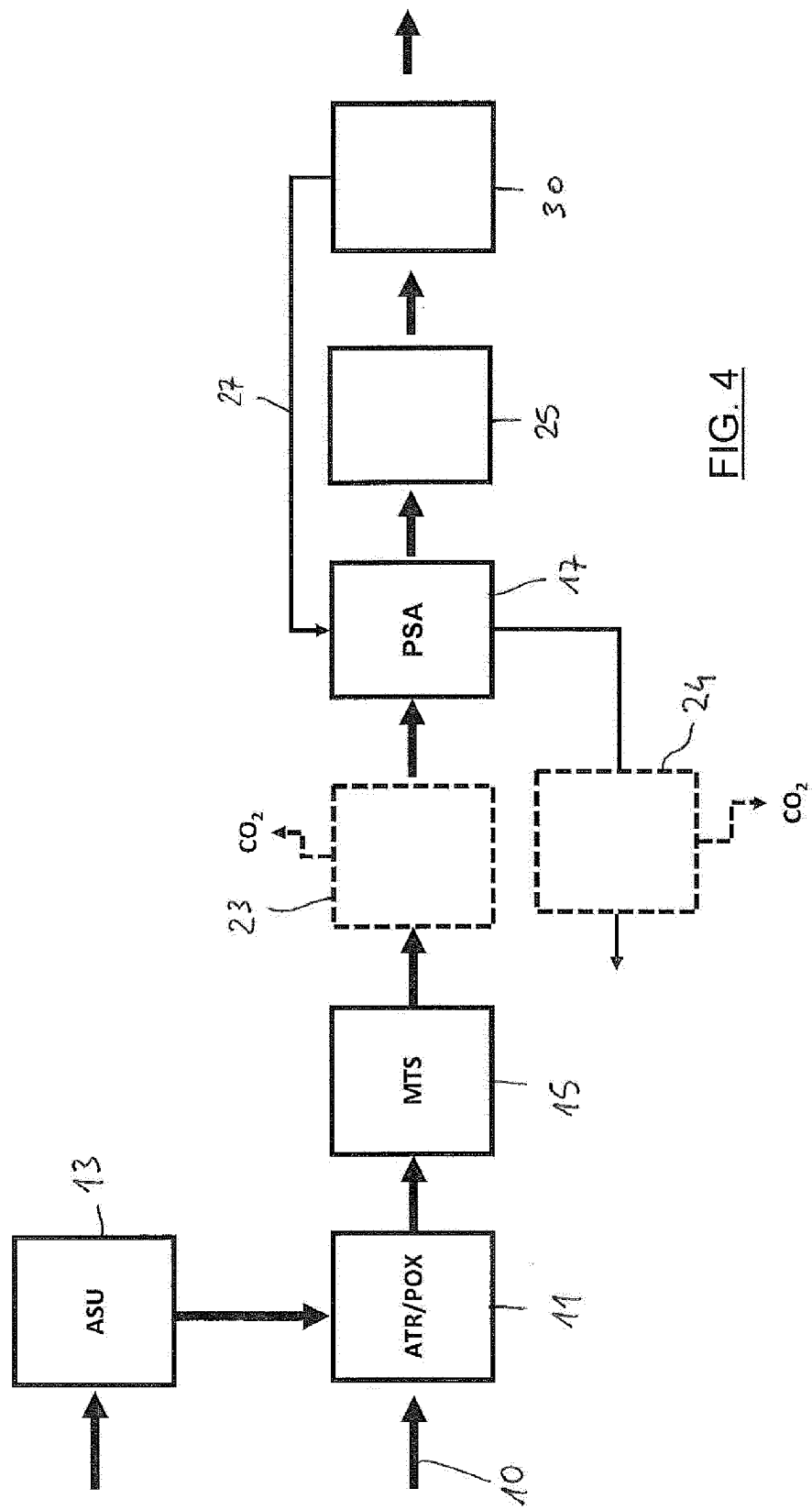
FIG. 4 shows some option features of the embodiment of FIG. 2.

FIG. 4 shows the optional CO2 removal units 23 and 24 for the embodiment of FIG. 3.

Example

The following table compares examples for a notional ammonia plant with 5,000 metric tons per day capacity. The table compares two cases:
(1) conventional layout with a primary reformer and a secondary reformer, high-temperature shift, low-temperature shift, CO2 removal (aMDEA wash) and methanation;
(2) Layout according to the invention.

|  |  | (1) Prior Art | (2) |
|---|---|---|---|
| Reformer radiant duty | Gcal/h | 250 | — |
| Total No. of tubes in the reformer | — | >1'000 | — |
| Flow to syngas compressor | m³/h | 25'000 | 16'700 |
| Power of syngas compressor | MW | 58 | 39 |

The example shows that the newly devised schemes require almost 30% less power for syngas compression than the prior art. This means that 30% larger capacity can be achieved with the same compression power. Moreover the invention does not require any steam reformer.

The invention claimed is:
1. A process for producing ammonia synthesis gas from a hydrocarbon source, comprising the following steps:
converting said hydrocarbon source into a raw synthesis gas, wherein said conversion takes place solely by means of a catalytic autothermal steam reforming or by means of a non-catalytic partial oxidation with steam, without a step of primary reforming,
carrying out said autothermal steam reforming or said partial oxidation with an oxidant which is oxygen or oxygen-enriched air;
water-gas shift treating of said raw synthesis gas, comprising a medium-temperature shift at a temperature of 200-300° C., thus obtaining a shifted synthesis gas;
purifying said shifted synthesis gas, said purification including at least a step of pressure-swing adsorption to remove residual carbon oxides and methane from the synthesis gas, obtaining a purified synthesis gas, and optionally, adding nitrogen to said purified synthesis gas, thus obtaining ammonia synthesis gas with a desired hydrogen to nitrogen ratio,
wherein said conversion of the hydrocarbon source into raw synthesis gas is carried in an autothermal steam reforming reactor or in a partial oxidation reactor, and
wherein the steam-to-carbon molar ratio in the feed of said reactor is lower than 2.

2. The process according to claim 1, wherein said temperature of the shift treatment is in the range 200 to 250° C.

3. The process according to claim 1, wherein said conversion of the hydrocarbon source into raw synthesis gas is carried out by means of autothermal steam reforming in ATR reactor, and the wherein steam-to-carbon ratio in the feed of said reactor is in the range 1.0-2.0.

4. The process according to claim 1, wherein said conversion of the hydrocarbon source into raw synthesis gas is carried out by means of partial oxidation in a POX reactor, and wherein the steam-to-carbon ratio in the feed of said reactor is in the range 0.5-1.0.

5. The process according to claim 1, wherein:
said steam reforming or partial oxidation is carried out with oxygen produced by an air separation unit, and said air separation unit also produces a nitrogen stream, and
at least a portion of said nitrogen stream is added to said purified synthesis gas, after pressure-swing adsorption, thus obtaining ammonia synthesis gas with a desired hydrogen to nitrogen ratio.

6. The process according to claim 1, wherein:
said steam reforming or partial oxidation is carried out with oxygen-enriched air produced by an air separation unit, and
the amount of said enriched air feed is determined in such a way to contain the full amount of nitrogen which is needed in the ammonia synthesis gas, so that the raw synthesis gas contains the required nitrogen and no further nitrogen is added to the synthesis gas.

7. The process according to claim 6, wherein the oxygen contained in the enriched air is not greater than 40% molar.

8. The process according to claim 6 wherein the purified synthesis gas, after pressure-swing adsorption, is subject to methanation.

9. The process according to claim 6, in which a synthesis loop purge is mixed with the syngas feed to PSA unit.

10. The process according to claim 1, wherein said purification of shifted synthesis gas, comprises only said step of pressure-swing adsorption, so that the purified synthesis gas after said step of pressure-swing adsorption and, optionally, after addition of nitrogen, constitutes the ammonia synthesis gas suitable for reaction in an ammonia synthesis section.

11. The process according to claim 1, wherein said medium-temperature shift is isothermal.

12. The process according to claim 1, wherein said purification of shifted synthesis gas, comprises a step of CO2 removal prior to said step of pressure-swing adsorption.

13. The process according to claim 1, said hydrocarbon source being natural gas.

14. A front-end of an ammonia plant, for production of ammonia synthesis gas from a hydrocarbon source such as natural gas, comprising:
- a conversion section comprising an autothermal reactor ATR or partial oxidation POX reactor for conversion of said hydrocarbon source and steam into a raw synthesis gas, and comprising no primary reformer;
- said ATR or POX reactor being fired with oxygen or oxygen-enriched air;
- a water-gas shift section arranged to provide shift of the raw synthesis gas effluent of said reactor, said shift section being suitable to operate exclusively in a medium-temperature range of 200-300° C., thus obtaining a shifted synthesis gas;
- a purification section of said shifted synthesis gas, said purification section including at least a pressure-swing adsorption unit arranged to remove residual carbon oxides and methane from the synthesis gas, obtaining a purified synthesis gas, and
- optionally, means for addition of nitrogen to said purified synthesis gas leaving the pressure-swing adsorption unit, thus obtaining ammonia synthesis gas with a desired hydrogen to nitrogen ratio,
- wherein said autothermal reactor or said partial oxidation reactor operates with a feed having a steam-to-carbon molar ratio lower than 2.

15. The front-end of an ammonia plant according to claim 14, said water-gas shift section operating in a range 200 to 250° C.

16. The front-end of an ammonia plant according to claim 14, further comprising an air separation unit delivering oxygen or oxygen-enriched air to said reactor, and said air separation unit being selected from the group consisting of: cryogenic type, pressure swing adsorption type, vacuum pressure swing adsorption type, and membrane type.

17. The process according to claim 2, said temperature of the shift treatment being in the range 230 to 250° C.

18. The process according to claim 7, where the oxygen contained in the enriched air is in the range 30% to 40% molar.

19. The front-end of an ammonia plant according to claim 15, said water-gas shift section operating in a range 230 to 250° C.

* * * * *